(12) United States Patent
Noguchi et al.

(10) Patent No.: US 7,187,814 B2
(45) Date of Patent: Mar. 6, 2007

(54) OPTICAL ADD/DROP DEVICE

(75) Inventors: Masaji Noguchi, Yokohama (JP);
Toshihisa Kyouno, Yokohama (JP);
Hideyuki Miyata, Kawasaki (JP);
Yutaka Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 194 days.

(21) Appl. No.: 10/960,023

(22) Filed: Oct. 8, 2004

(65) Prior Publication Data
US 2005/0271314 A1    Dec. 8, 2005

(30) Foreign Application Priority Data
Jun. 4, 2004    (JP)    ............... 2004-167746

(51) Int. Cl.
G02F 1/335    (2006.01)
G02B 6/42    (2006.01)
G02B 6/26    (2006.01)

(52) U.S. Cl. .......................................... 385/7; 385/16

(58) Field of Classification Search ..................... None
See application file for complete search history.

(56) References Cited

U.S. PATENT DOCUMENTS 5,452,314 A *    9/1995    Aronson .................. 372/20
2003/0179988 A1*    9/2003    Kai et al. ................. 385/24

FOREIGN PATENT DOCUMENTS

| JP | 11-218790 | 8/1999 |
|---|---|---|
| JP | 11-289296 | 10/1999 |
| JP | 2000-241782 | 9/2000 |
| JP | 2003-316973 | 9/2000 |
| JP | 2001-194640 | 7/2001 |
| JP | 2001-228450 | 8/2001 |
| JP | 2002-368317 | 12/2002 |
| JP | 2003-51741 | 2/2003 |
| JP | 2003-53335 | 2/2003 |
| JP | 2003-57617 | 2/2003 |
| JP | PCT/JP03/4793 | 4/2003 |
| JP | 2003-344817 | 12/2003 |

OTHER PUBLICATIONS

M. Noguchi et al., "High speed control for Acousto-optic tunable filter", IEICE B-10-40, p. 328, 2002.

(Continued)

*Primary Examiner*—Sung Pak
(74) *Attorney, Agent, or Firm*—Staas & Halsey LLP

(57) ABSTRACT

A drop-type AOTF is used as a configuration for removing from a through signal an optical signal having the same wavelength as that of an optical signal to be added. To the drop-type AOTF, RF signals are input to always select all of wavelengths, and an RF signal is not input for a wavelength desired to be rejected. As a result, the optical signal having the wavelength for which the RF signal is stopped is not selected by the drop-type AOTF, and cannot pass through. Since there is only one RF signal whose input is stopped, a "drawing effect" does not occur, and control of an optical add/drop device is simplified. Additionally, since high-speed switching can be made, and a wavelength to be added can be varied, restrictions are not imposed on a network configuration.

8 Claims, 16 Drawing Sheets

OTHER PUBLICATIONS

T. Nakazawa et al., "Recent Progress on AO Devices", IEICE C vol. J86-C, No. 12, pp. 1236-1243, Dec. 2003.

Y. Kai et al., "Photonic Gateway with μs-order Wavelength path Control for Metro Access Networks," ECOC2003, 2003.

M. Noguchi et al., "Compact 4-channel integrated Acousto-Optic Tunable filter Sub System with High-Speed Wavelength Switching", IEICE, B_10_61, 2003.

G. Nakagawa et al., "Photonic Gateway for Metro Network using Acoustic-Optic Tunable Filter", Technical Report of IEICE, 2003.

* cited by examiner

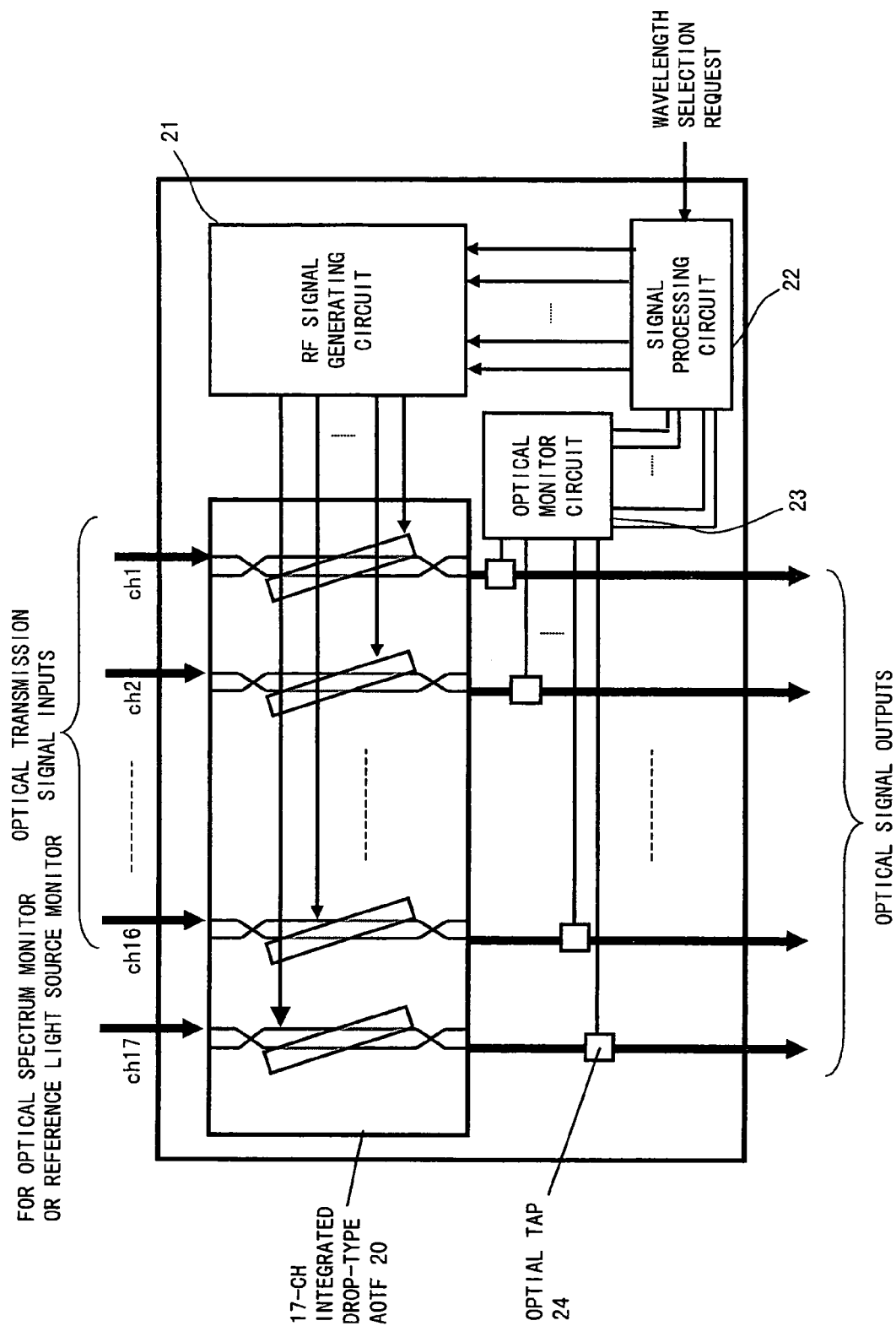
F I G. 11

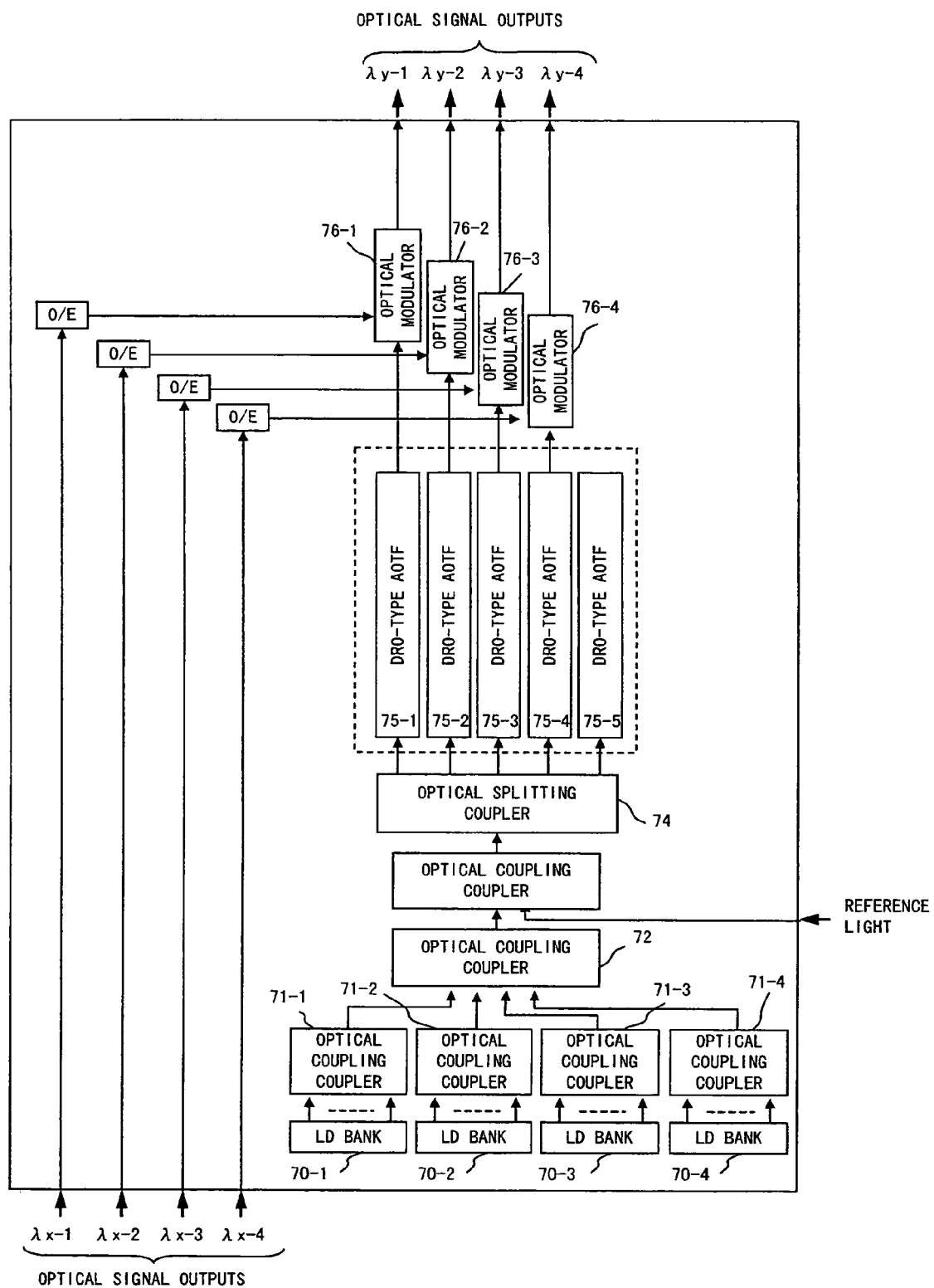
F I G. 1 2

OPTICAL ADD/DROP DEVICE

BACKGROUND OF THE INVENTION

1. Field of the Invention

The present invention relates to an optical add/drop device that can add/drop an optical signal having an arbitrary wavelength in an optical communications appliance used in an optical communications network.

2. Description of the Related Art

The demand for an ultra-long-haul and large-capacity optical communications device has been growing for the purpose of configuring a future multimedia network. As a method implementing a large capacity, a WDM (Wavelength Division Multiplexing) method exists. Research and development of this method have been under way since there are advantages such that an optical bandwidth/large capacity of an optical fiber can be effectively used, and the like.

Especially, in an optical communications network, a function for passing/adding/dropping an optical signal on demand, and an optical routing/crossconnect function for selecting an optical transmission path are required at each point on the network. Accordingly, an OADM (Optical Add/Drop Multiplexing) device for passing/adding/dropping an optical signal has been researched and developed. The OADM device is classified into an OADM device of a fixed wavelength type, which can add/drop only an optical signal having a fixed wavelength, and an OADM device of an arbitrary wavelength, which can add/drop an optical signal having an arbitrary wavelength.

In the meantime, an AOTF (Acousto-Optic Tunable filter) operates to extract only light having a selected wavelength. Therefore, the AOTF can arbitrarily select a wavelength unlike a fiber grating whose selected wavelength is fixed. Since the AOTF is also a variable wavelength selecting filter, it is also available as a variable wavelength selecting filter in a tributary station, which is a station for adding/dropping an optical signal between end stations. For such reasons, an OADM device using the AOTF has been researched and developed.

FIG. 1 shows a configuration for explaining the principle of operations of the AOTF. In this figure, the AOTF is configured by forming two optical waveguides 1 and 2 on a substrate 7 of lithium niobate (LiNbO$_3$), which is one type of ferroelectric crystals and shows a piezoelectric effect, with a titanium (Ti) diffusion method.

These optical waveguides 1 and 2 intersect in two portions, and PBSs (Polarization Beam Splitters) 3 and 4 of a waveguide type are provided in the portions where the waveguides intersect. Additionally, a SAW guide 6 of a metal film is formed on the two optical waveguides 1 and 2 between the portions where the two waveguides 1 and 2 intersect. For the SAW guide 6, an IDT (Inter Digital Transducer) 5 having an interleaved comb structure is provided. A SAW (Surface Acoustic Wave), which is generated by applying a control signal (hereinafter referred to as an RF signal) of a 160- to 180-MHz band to the IDT 5, propagates along the SAW guide 6.

In FIG. 1, if light beams having wavelengths λ1, λ2, and λ3 are input to a port 11 of the AOTF, the input light where polarization wave modes such as TE mode and TM mode are mixed is separated by the PBS 3 into the TE mode and the TM mode, and the TE mode and the TM mode light beams propagate along the optical waveguides 1 and 2. Here, a surface acoustic wave is generated by applying an RF signal f1 having a particular frequency, which is generated by an RF signal generating circuit 10, to the IDT 5. If the surface acoustic wave propagates along the SAW guide 6, refractive indices of the two optical waveguides 1 and 2 periodically change due to an AO (Acousto-Optic) effect in portions of the optical waveguides 1 and 2, which intersect the SAW guide 6.

Accordingly, polarization wave modes rotate only in light having a particular wavelength, which interacts with the periodical change in the refractive indices, in the input light, and the TE mode and the TM mode change their places. A rotation amount is proportional to an action length with which the light beams of the TE and the TM modes interact with the change in the refractive indices, and the power of an RF signal. The action length is adjusted by an interval between absorbing elements 8 and 9, which sandwich the IDT 5 and are formed on the optical waveguides 1 and 2, and absorb a surface acoustic wave. Accordingly, the action length and the power of an RF signal are optimized, whereby the TM mode light having that wavelength is converted into the TE mode light on the optical waveguide 1, and TE mode light having that wavelength is converted into TM mode light on the optical waveguide 2. Then, traveling directions of the converted TE mode light and TM mode light are changed by the PBS4. As a result, only light having a wavelength which makes interaction is selected as dropped light, and light having a wavelength which does not make interaction passes through, and becomes output light.

FIG. 1 shows that the optical signals having the wavelength λ1 are acted upon by the RF signal f1, and selected as dropped light.

As described above, the AOTF can select and drop only light having a wavelength according to the frequency of an RF signal. Additionally, the AOTF can change the wavelength of selected light by varying the frequency of the RF signal.

Additionally, at this time, light beams output from a port 12 are optical signals (wavelengths λ2 and λ3), which are obtained by removing only light having a wavelength corresponding to the frequency of an RF signal from the light beams input to the port 11. Therefore, the AOTF can be considered to have a rejection function.

FIG. 2 is a schematic for explaining a configuration of a drop-type AOTF.

The drop-type AOTF shown in this figure has a structure where two types of side-lobe reducing methods are used together, and is configured by thin-film skew SAW guides connected in two stages. This AOTF can select one wavelength at high extinction ratio and with a low loss. A characteristic of an add loss of 3 dB or smaller is implemented with a high extinction ratio of −25 dB or smaller for adjacent side-lobes having an interval of 100 GHz, and −35 dB or smaller for non-adjacent side-lobes. This reaches a practical level. A change in a selected wavelength has a linear relationship with a change in the frequency of an RF signal. It was verified that switching can be quickly made for a high speed of 12 μs including a switching signal delay within a control circuit.

In FIG. 2, the AOTFs which drop an optical signal having a desired wavelength are only connected in two stages in series, and the principle of their operations is similar to that shown in FIG. 1. Therefore, corresponding portions are only denoted with corresponding numerals, and an explanation of their operations is omitted.

FIG. 3 explains a configuration of a 5-ch integrated drop-type AOTF module.

As shown in this figure, the AOTF is a waveguide-type device. Therefore, it is easy to put AOTFs into an array and to integrate the AOTFs. Although this figure shows an example using the 5-ch integrated drop-type AOTF, the AOTF can be implemented as an AOTF having more channels. This module is configured by a 5-ch integrated drop-type AOTF 20, an RF signal generating circuit 21, a signal processing circuit 22, and an optical monitor circuit 23. This AOTF can simultaneously select arbitrary 4 wavelengths from a WDM signal having an interval of 100 GHz. Selected light beams from the AOTF are branched by optical taps 24, PD monitor values are obtained the an optical monitor circuit 23, and arithmetic operations are performed by the signal processing circuit 22 based on the PD monitor values, so that the RF signal generating circuit 21 is controlled. A wavelength search at the time of a wavelength selection, and RF frequency tracking, which matches an AOTF transmission characteristic after the selection with a signal wavelength, are controlled by the signal processing circuit 22 and firmware. A fifth channel on the same substrate is available as a reference for a selection as shown in FIG. 3. Since influences of a deviation caused by temperature or environments of a component, etc., can be eliminated in this way, the accuracy of control can be improved by using a relationship between the wavelength of the reference light source selected by the fifth channel AOTF and an RF signal for other channels' control.

FIG. 4 explains a configuration of a reject-type AOTF.

If an unselected light output port of the AOTF is used, it functions as a reject-type filter, which blocks a particular wavelength.

To implement a reject ratio of a high practical level, the reject-type AOTF has a configuration where 3 AOTFs having the same characteristic are connected in 3 stages by being folded at end faces with waveguide-type reflectors in FIG. 4. By applying an RF signal, different wavelengths having a wavelength interval of 200 GHz can be simultaneously rejected. However, since the AOTFs are connected in 3 stages, its add loss is larger than that of the drop-type AOTF connected in 2 stages in FIG. 2.

In FIG. 4, the reject-type AOTF performs operations similar to those explained with reference to FIG. 1 except that the AOTFs are connected in 3 stages in series by using the unselected light output port of the AOTF. Therefore, an explanation of its operations is omitted.

FIG. 5 explains the operations of the reject-type AOTF module.

The AOTF module shown in FIG. 5 has a configuration where 4 wavelengths can be rejected. To recognize light of a WDM signal which flows from a network beforehand, a drop-type AOTF 31 is configured on the same substrate as the reject-type AOTF 30, the frequency of an RF signal output from the RF signal generating circuit 32 is changed from 160 MHz to 180 MHz, and the spectrum of selected light is monitored with the selected light monitor circuit 32. From monitoring results, RF signals corresponding to wavelengths desired to be rejected are generated with RF signal generating circuits 33-1 to 33-4, and given to the reject-type AOTF 30. If 2 wavelengths are simultaneously rejected, frequencies of 2 RF signals are generated, mixed with a mixer 34, and applied. If 4 wavelengths are simultaneously rejected, frequencies of 4 RF signals are generated, mixed with the mixer, and applied. An unselected light monitor circuit 35 is a circuit for monitoring whether or not the reject-type AOTF 30 can properly reject a desired wavelength. A signal processing circuit 36 performs the detection and the processes of monitor signals of the selected light monitor circuit 36 and the unselected light monitor circuit 35, and inputs an instruction signal to the RF signal generating circuits 32, and 33-1 to 33-4.

FIG. 6 explains a drawing effect of the reject-type AOTF.

In this figure, (a) shows a WDM signal input to the reject-type AOTF module shown in FIG. 5. 32 C- and L-band wavelengths composed of λ1 to λ32 having a wavelength interval of 200 GHz configure the WDM signal. (b) shows a WDM signal output from the reject-type AOTF module. Dotted lines of λ2 to λ3 indicate a rejected state. (c) shows RF signals given to the reject-type AOTF module in order to reject λ2 and λ3 from the WDM input signal. f2 and f3 respectively correspond to λ2 and λ3. Dotted lines indicate unused RF signals. In (c), a frequency interval of the RF signals is indicated by Δf1. Normally, the frequency interval is approximately 100 kHz. (d) shows a case where λ2 to λ5 are rejected from the WDM input signal. (e) shows RF signals given to the reject-type AOTF module in order to implement (d). (e) shows that the frequency interval of the RF signals changes from Δf1 to Δf2 (Δf2<Δf1) by changing from the rejection of 2 wavelengths to the rejection of 4 wavelengths. The phenomenon that the frequency interval of RF signals changes from Δf1 to Δf2 (Δf2<Δf1) due to an increase in the number of rejected wavelengths is referred to as a "drawing effect" in this specification. The "drawing effect", which occurs when the number of rejected wavelengths increases, is a cause to make a control for rejecting a wavelength complex, and this effect is one of serious problems in control. It is difficult to apply the reject-type AOTF to an OADM due to the "drawing effect", and a restriction such that a wavelength rejection interval of a practical level is 200 GHz. Therefore, a fixed-band rejection filter using a dielectric multi-layer film, etc., is used at present. Accordingly, an add function is a fixed type.

FIG. 7 explains a concept of functions of an optical add/drop (OADM) device.

When WDM light including optical wavelengths λ1, λ2, λ3, and λ4 is input to a port a of the optical add/drop device, the wavelengths λ1, λ2, λ3, and λ4, which are dropped within the device, are output to a port c.

Additionally, light is added from a port d. The example shown in FIG. 7 indicates that wavelengths λ5, λ6, λ7, and λ8 are added to the output light of the port b, and output.

Explanation of an OADM Device Using a Reject-Type AOTF

FIG. 8 explains operations of an optical add/drop device using a reject-type AOTF module.

In this figure, the reject-type AOTF module 40 is used to reject a wavelength within network light, which corresponds to an added wavelength, when an adding unit adds the wavelength to the WDM signal which flows from a network. This device has restrictions such as the complexity of control caused by the "drawing effect", and a practical level of a wavelength rejection interval of 200 GHz. In drop-type AOTF modules 41-1 to 41-4 of a dropping unit can drop a wavelength at a wavelength interval of 100 GHz, and do not have the complexity of control caused by the "drawing effect".

WDM light input from a port a is configured, for example, by 16 C-band wavelengths and 16 L-band wavelengths. An optical branching coupler 42 simply branches the input WDM light. A WDM amplifier 43 amplifies the dropped WDM light. Then, an optical splitting coupler 44 splits the WDM light into the number of wavelengths to be dropped. Optical signals having wavelengths λ1 to λ4 are output from the WDM light beams input to the drop-type AOTF modules 41-1 to 41-4.

After wavelengths λ5 to λ8 of added light beams are converted by AOTF-type tunable transponders 45-1 to 45-4, which will be described later, and amplified by optical amplifiers 46-1 to 46-4, these wavelengths are coupled by an optical coupling coupler 47, and coupled with through light by an optical coupling coupler 48. At this time, the reject-type AOTF module 40 rejects optical signals having the same wavelengths as those of the added optical signals. WDM light output from the optical coupling coupler 48 is amplified by a WDM amplifier 49, and transmitted to a transmission path.

FIG. 9 explains operations of an optical add/drop device using a fixed-band rejection filter.

In this figure, the same constituent elements as those shown in FIG. 8 are denoted with the same reference numerals, and their explanations are omitted.

With the configuration shown in FIG. 9, problems such as the complexity of control caused by the "drawing effect", and a restriction of a wavelength rejection interval to 200 GHz at a minimum can be solved. However, since an add function is fixed, flexibility is lost. For example, if an optical network is configured with an OADM device using a fixed-band rejection filter 51, the side of an Add function is fixed to 4 wavelengths. Therefore, the number of nodes is restricted to 16 if the network is configured in consideration of a WDM signal having a maximum of 64 wavelengths.

In the fixed-type optical add/drop device shown in FIG. 9, wavelengths to be added are fixed. Therefore, a wavelength conversion function of transponders 45'-1 to 45'-4 may be fixed. Wavelengths are input to the fixed-band rejection filter 51 via a variable optical attenuator 50, coupled with through light, and transmitted to a transmission path.

In an optical communications network, a shift from a conventional optical stream transmission method to an optical burst switching transmission method is newly anticipated. This is an optical transfer network where the use efficiency of network resources are improved by paying attention to a statistical nature of Internet traffic having a high burst nature, and by assigning a wavelength for a time period required for a burst data transfer at a time interval of the order of milliseconds. By making a shift to the optical burst switching transmission method, the use efficiency of the network resources can be improved. To implement this, wavelength switching of the order of milliseconds or shorter is required. Since an AOTF can make wavelength switching of the order of microseconds, it is known to be effective as a core device of the optical burst switching transmission.

The contents of the above described conventional techniques are recited in the following patent documents 1 to 8, and non-patent documents 1–4.

[patent document 1] Japanese Patent Application Publication No. 2003-344817

[patent document 2] Japanese Patent Application No. 2003-053335

[patent document 3] International Patent Application No. PCT JP 03 04793

[patent document 4] Japanese Patent Application NO. 2003-51741

[patent document 5] Japanese Patent Application Publication No. HEI11-218790

[patent document 6] Japanese Patent Application Publication No. HEI11-289296

[patent document 7] Japanese Patent Application Publication No. 2000-241782

[patent document 8] Japanese Patent Application No. 2003-316973

[non-patent document 1] paper name: "Improving the Speed of Acousto-optic Tunable Filter (AOTF) Control", paper No. B-10-40, society name: IEICE, 2002 Society Conference, written by M. Noguchi, Y. Kai, T. Ueno, H. Miyata, H. Onaka

[non-patent document 2] paper name: "Recent Technological Advances in AO Elements", IEICE Transactions C, Vol. J86-C No. 12 pp. 1236 to 1243, written by T. Nakazawa, H. Miyata, H. Miyata, Y. Kai, Y. Tsunoda, H. Onaka

[non-patent document 3] paper name: "Photonic Gateway with Us-order Wavelength Path Control for Metro Access Networks", society name: ECOC 2003, written by Y. Kai, K. Sone, M. Noguchi, T. Ueno, T. Nakazawa, H. Miyata, H. Miyata, H. Onaka

[non-patent document 4] paper name: "Development of High-speed Wavelegnth Selection Small 4-channel integrated AOTF Subsystem", paper no. B_10_61, society name: IEICE, 2003 Society Conference, written by M. Noguchi, Y. Kai, T. Ueno, H. Miyata, H. Onaka, T. Nakazawa, H. Miyata As described above, when light is added in an optical wavelength add/drop device using an AOTF, a wavelength which flows from a network and corresponds to a wavelength to be added must be rejected.

With the conventional techniques, an optical wavelength add/drop device is configured by using a reject-type AOTF. This device has a mechanism such that an RF signal corresponding to a wavelength to be rejected is given to the AOTF. Therefore, a plurality of RF signals must be mixed and given if a plurality of wavelengths are rejected. However, there are problems that the frequency interval of RF signals changes (so-called the drawing effect) due to an increase/decrease in the number of wavelengths, and a control becomes complex.

Conventionally, there is also a problem that a D/U characteristic (a ratio of desirable signals to undesirable signals) deteriorates since RF signals are mixed.

Furthermore, conventionally, a WDM signal must be monitored with a spectrum analyzer function, which hinders high-speed switching from being supported.

Still further, a reject-type AOTF cannot be practically used unless a wavelength interval is equal to or higher than 200 GHz. Due to such problems, a dynamic reject function is not practically used in the present situation, and a fixed-band rejection filter is used. If an optical network is configured with an OADM device using a fixed-band rejection filter, the side of an Add function is fixed to 4 wavelengths. Therefore, the number of nodes is restricted to 16 if the network is configured in consideration of a WDM signal having a maximum of 64 wavelengths.

SUMMARY OF THE INVENTION

An object of the present invention is to provide an optical add/drop device that can be controlled with ease, can make high-speed switching, and does not impose restrictions on a network configuration.

A first optical add/drop device according to the present invention, which adds/drops an optical signal having a predetermined wavelength to/from a wavelength multiplexed optical signal which flows from a network, comprises: a dropping unit for dropping an input wavelength multiplexed optical signal; a splitting unit for splitting an optical signal having a predetermined wavelength from a first optical signal dropped by the dropping unit; a rejecting unit, which is configured by an acousto-optic tunable filter, for selecting a through optical signal by applying a corresponding RF signal to the acousto-optic tunable filter, for rejecting an optical signal to be rejected by stopping an RF signal applied to the acousto-optic tunable filter, and for rejecting an optical signal having the same wavelength as that of an optical signal to be added from a second optical signal dropped by the dropping unit; and an adding unit for adding an optical signal having a predetermined wavelength to an optical signal which passes through the rejecting unit.

A second optical add/drop device according to the present invention, which adds/drops an optical signal having a predetermined wavelength to/from a wavelength multiplexed optical signal which flows from a network, comprises: a fixed adding/dropping unit, whose operation for adding/dropping an optical signal is restricted to a fixed wavelength, for receiving a wavelength multiplexed optical signal which flows from a network, and for adding/dropping an optical signal; a rejecting unit, which is configured by an acousto-optic tunable filter and to which an optical signal having a wavelength dropped from the fixed adding/dropping unit is input, for passing an optical signal having a wavelength desired to pass through by applying a corresponding RF signal to the acousto-optic tunable filter, and for rejecting an optical signal having a wavelength desired to be rejected by stopping a corresponding RF signal from being applied to the acousto-optic tunable filter; and an adding unit for adding an optical signal by inputting an optical signal having the same wavelength as that of the rejected optical signal to the fixed adding/dropping unit.

According to the present invention, an optical add/drop device which can be controlled with ease, can make high-speed switching, and has no restrictions on a network unlike a reject-type AOTF can be provided.

BRIEF DESCRIPTION OF THE DRAWINGS

FIG. 11 explains a configuration of a 17-ch integrated drop-type AOTF module;

FIG. 12 explains an AOTF-type tunable transponder;

DESCRIPTION OF THE PREFERRED EMBODIMENTS

Figure 1:
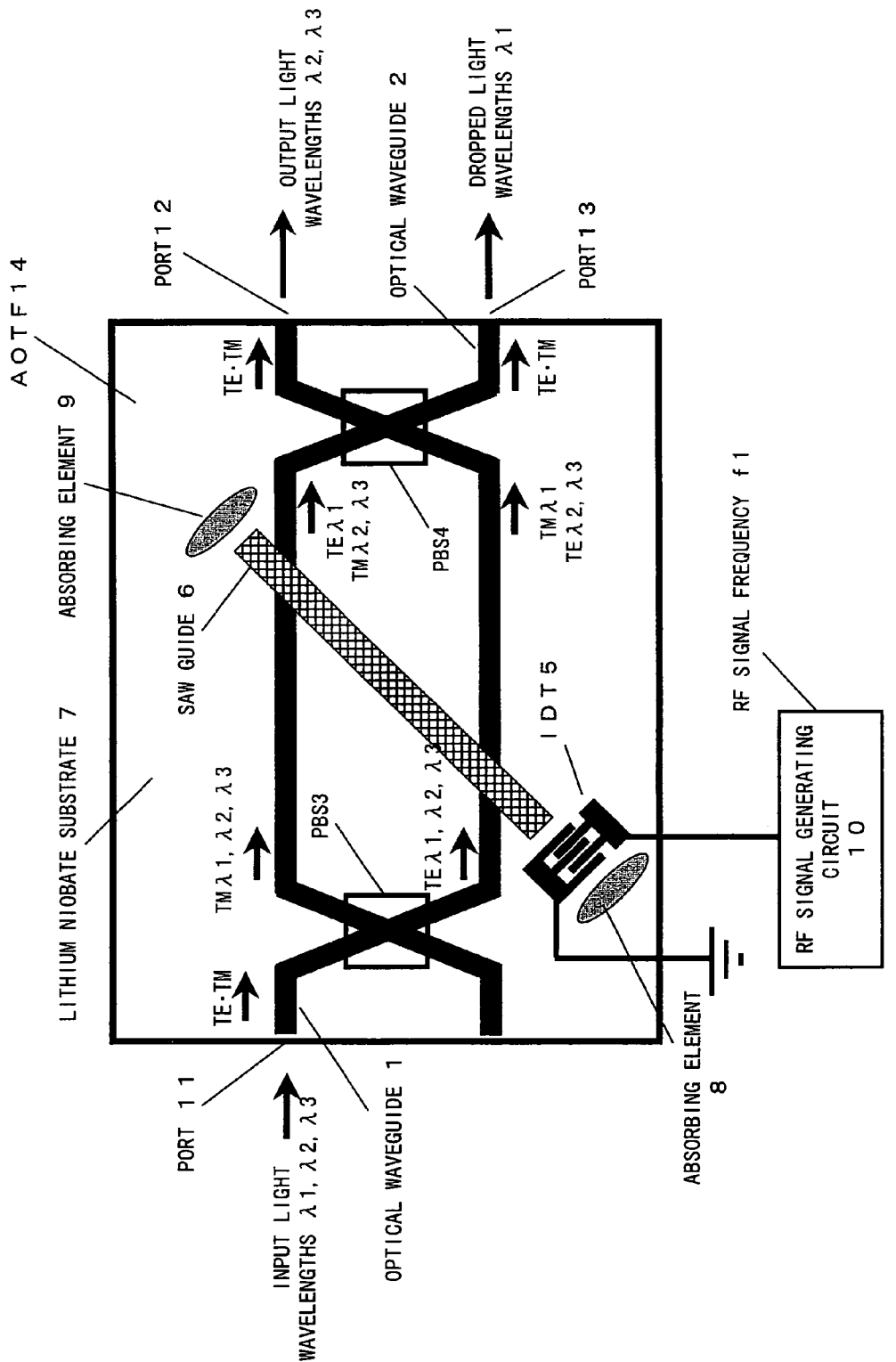
FIG. 1 shows a configuration for explaining the principle of operations of an AOTF.
Figure 2:
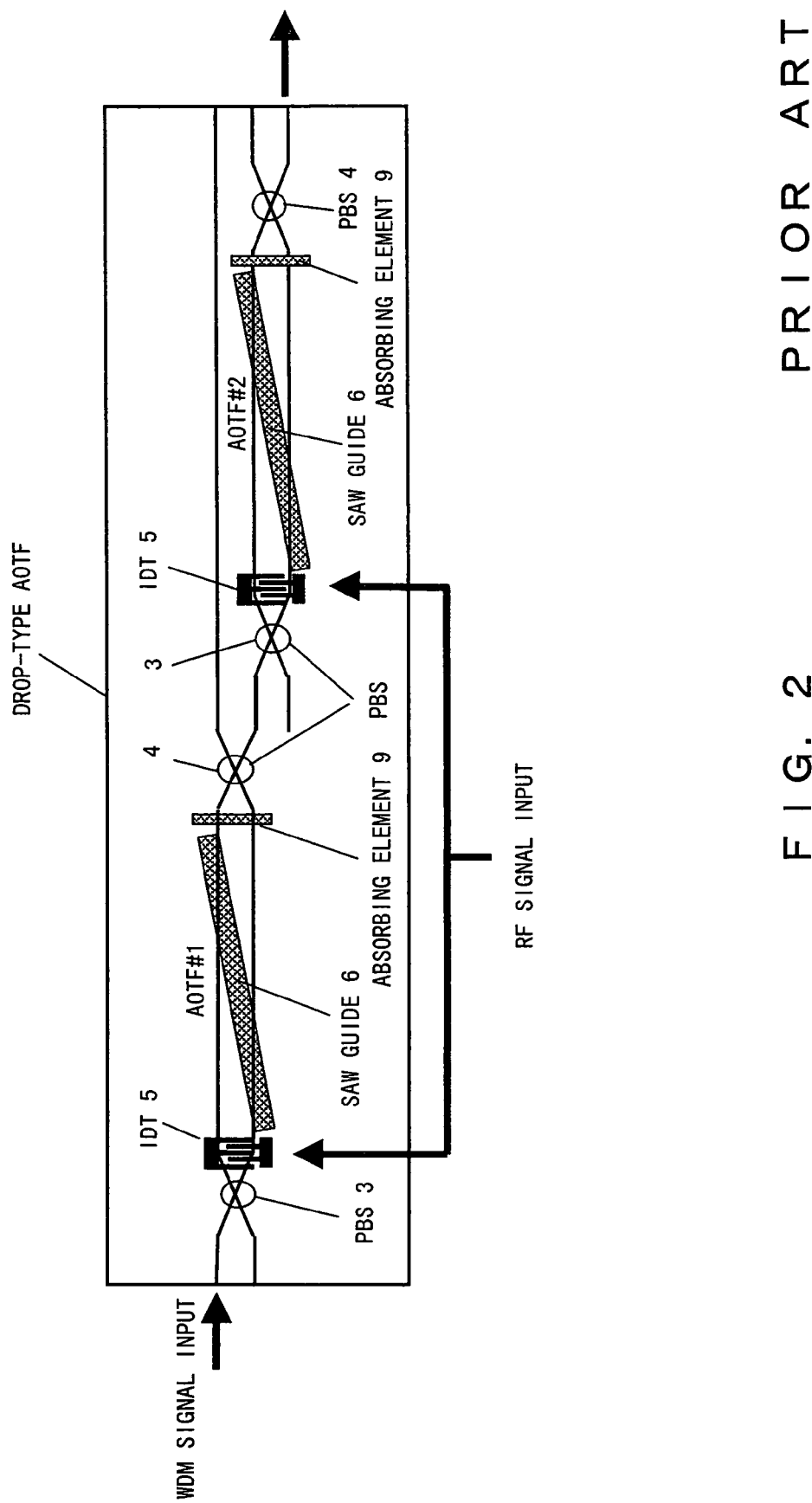
FIG. 2 explains a configuration of a drop-type AOTF.

In preferred embodiments according to the present invention, a drop-type AOTF function is used to reject a wavelength in an adding unit.

A WDM signal which flows from a network is split/dropped with an optical dropping unit or an optical splitter, or a combination of optical dropping unit and splitter, and ports of split/dropped signals are connected to input ports of drop-type AOTFs. Wavelengths from output ports of the drop-type AOTFs are multiplexed or coupled by an optical multiplexer or an optical coupler, or a combination of optical multiplexer and coupler. At the time of passing a WDM signal, a wavelength selection is made. At the time of adding a wavelength, a reject function is implemented by stopping a selection operation of a drop-type AOTF in order to reject a particular wavelength of a WDM signal which flows from a network. By using the drop-type AOTF in this way, an arbitrary wavelength can be rejected from a WDM signal. Also a wavelength interval of 100 GHz can be used. Additionally, each of drop-type AOTFs rejects one wavelength. Therefore, there is no need to mix and apply RF signals applied to the drop-type AOTFs, so that the drawing effect is not caused, and the complexity of control is resolved. Furthermore, since RF signals are not mixed, a deterioration of a D/U characteristic, which is caused by mixture, can be eliminated. For a control, an AOTF which is not used for an operated line is prepared from among drop-type AOTFs configured as an array, reference light is input to the AOTF, and continuously selected. Frequencies of RF signals given to AOTFs of operated lines are calculated by using the RF frequency of the selected signal as a reference, and the calculated frequencies are given, so that high-speed wavelength rejection can be made, and the drop-type AOTF can be applied to optical burst switching. This eliminates the need for a spectrum monitor required by the conventional techniques.

Furthermore, if an optical network is configured, the number of wavelengths on the side of an Add function, and wavelengths can be arbitrarily set. This resolves the problem that the number of nodes is restricted to 16 if the network is configured in consideration of a WDM signal having a maximum of 64 wavelengths.

A drop-type AOTF function is applied to a dropping unit as conventional. To an adding unit, a transponder using a drop-type AOTF is applied. In this way, all of a drop function, an add function, and a wavelength rejection (block) function of the device can be implemented by using a drop-type AOTF, and also an optical burst switching transmission can be made according to a wavelength control of the order of microseconds.

Figure 10:
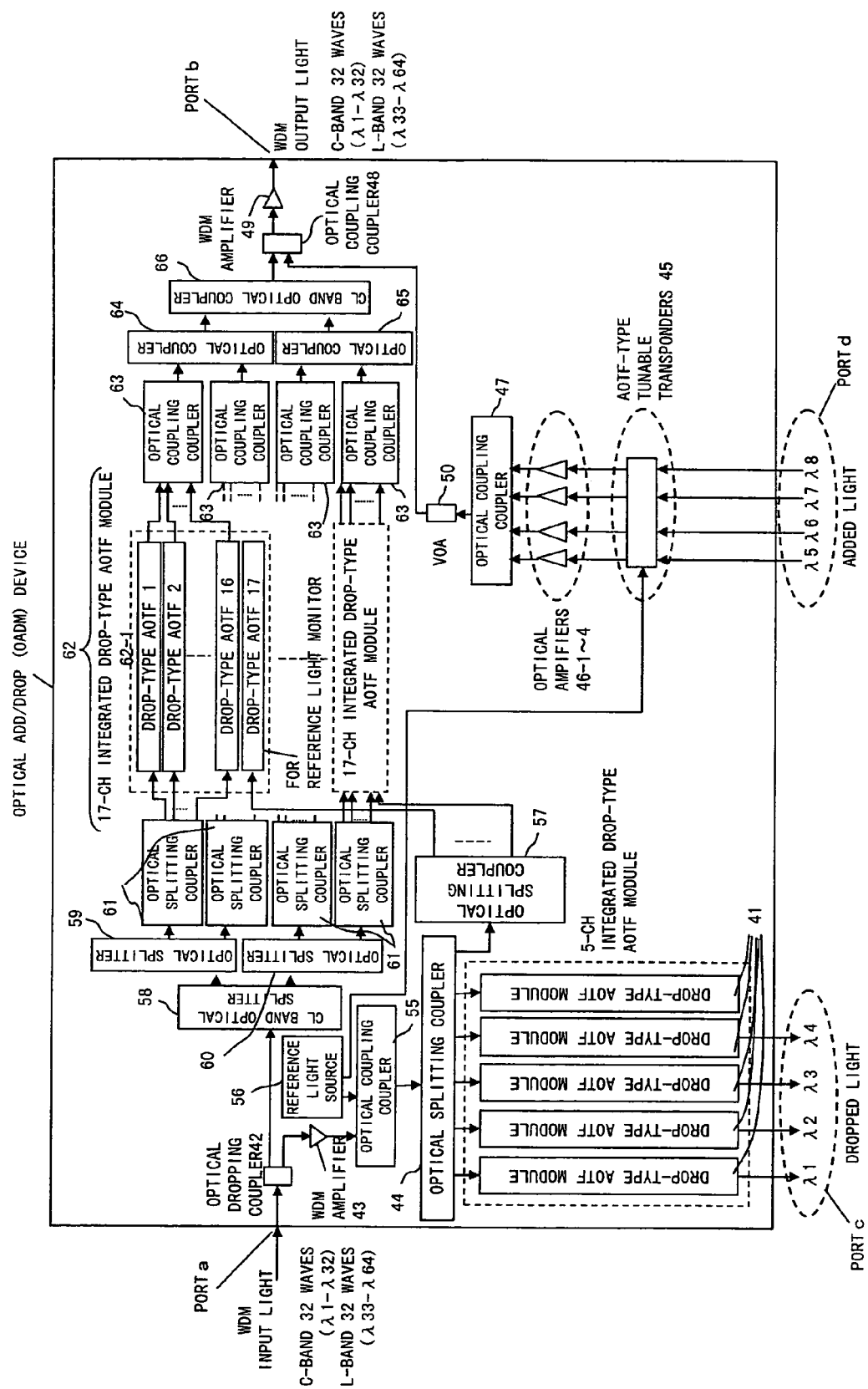
FIG. 10 explains operations of an optical add/drop device according to a first preferred embodiment of the present invention.

FIG. 10 explains operations of an optical add/drop device according to a first preferred embodiment of the present invention. FIG. 11 explains a configuration of a 17-ch integrated drop-type AOTF module. FIG. 12 explains an AOTF-type tunable transponder.

In FIG. 10, a WDM transmission signal which flows from a network is input to a port a. This figure exemplifies the WDM transmission signal configured with 32 C-band wavelengths ($\lambda 1$ to $\lambda 32$) having an interval of 100 GHz, and 32 L-band wavelengths ($\lambda 33$ to $\lambda 64$) having an interval of 100 GHz. The WDM transmission signal input to the port a is dropped by an optical dropping coupler 42 into an optical signal to be dropped to a port c, and an optical signal to be coupled with light added from a port d and transmitted from the port b to the network. The optical signal to be coupled with the light added from the port d and transmitted from the port b to the network is split into C and L bands by a CL band splitter 58 configured by a dielectric multi-layer film, etc. Furthermore, the respective C- and L-band wavelengths are split into groups each composed of 16 wavelengths by optical splitters 59 and 60, which are configured by a dielectric multi-layer film, etc. The signals split in units of 16 wavelengths are further split into 16 by optical splitting couplers 61. The 16 split light beams are connected to drop-type AOTFs of 17-ch integrated drop-type AOTF modules 62-1 to 62-4. Wavelengths selected by the drop-type AOTFs of the 17-ch integrated drop-type AOTF modules 62-1 to 62-4 are coupled by optical coupling couplers 63, further coupled by optical couplers 64 and 65, which are configured by a dielectric multi-layer film, etc. and a CL band coupler 66 configured by a dielectric multi-layer film, etc., coupled with the added light by an optical coupling coupler 48, and transmitted to the port b via a WDM amplifier 49.

A 17th channel drop-type AOTF of the 17-ch integrated drop type AOTF modules 62-1 to 62-4 is used to monitor reference light. As the reference light output from a reference light source 56, a signal including a WDM transmission signal where one or two wavelengths are provided on the side of the shortest wavelength and/or on the side of the longest wavelength is used. The reference light from the reference light source 56 is input to drop-type AOTFs 41 via an optical coupling coupler 55 and an optical splitting coupler 44, and also input to the 17-ch integrated drop-type AOTF modules 62-1 to 62-4 via an optical splitting coupler 57. Additionally, the reference light from the reference light source 56 is also input to AOTF-type tunable transponders 45.

As a control of the drop-type AOTFs, a control is performed to continuously select the reference light, and to stop a selection operation of each corresponding drop-type AOTF among selection operations of the drop-type AOTFs of the 17-ch integrated drop-type AOTF modules 62-1 to 62-4 if an operation for rejecting a wavelength from the WDM signal is required in correspondence with a wavelength to be added. In this way, reject control for a particular wavelength can be implemented. In an adding unit, wavelengths of external Add signals are converted on demand by the AOTF-type tunable transponders 45, amplified by optical amplifiers 46-1 to 46-4, coupled by an optical coupling coupler 47, output-adjusted by a VOA (Variable Optical Attenuator) 50, and input to the optical coupling coupler 48. To an AOTF-type tunable transponder 45, the reference light is input. Therefore, a control is performed to continuously select the reference light similar to the 17-ch integrated drop-type AOTF modules 62-1 to 62-4 applied to the rejecting unit, and a wavelength is selected from an LD bank in correspondence with a wavelength to be added. The LD bank is implemented as a multi-wavelength light source by coupling light beams from a plurality of LDs which output light having a plurality of wavelengths.

In the meantime, for a control of the drop to the port c, a WDM signal dropped from the optical dropping coupler 42 is optically amplified by a WDM amplifier 43, coupled with the reference light by an optical coupling coupler 55, and split into 6 by an optical splitting coupler 44. A control is performed to continuously select the reference light in one of the drop-type AOTFs 41, and optical signals having respective wavelengths are output from the other 4 drop-type AOTFs according to the drop control.

The reference light is provided on the side of longer wavelengths of the longest wavelength or the side of shorter wavelengths of the shortest wavelength of a principal signal. If only one reference light is provided, an RF signal is given to the AOTF by calculating an interval of a signal having an RF frequency from the RF frequency at which the reference light is selected in order to select a desired wavelength.

If the reference light is provided on both of the sides of the shortest and the longest wavelengths, the RF frequency at which the reference light of the shortest wavelength is selected, and the RF frequency at which the reference light of the longest wavelength is selected are obtained. Then, a difference between these frequencies is equally divided by the number of wavelengths between the RF frequencies, so that the selected RF frequency is obtained.

FIG. 11 explains a configuration of a 17-ch integrated drop-type AOTF module.

Figure 3:
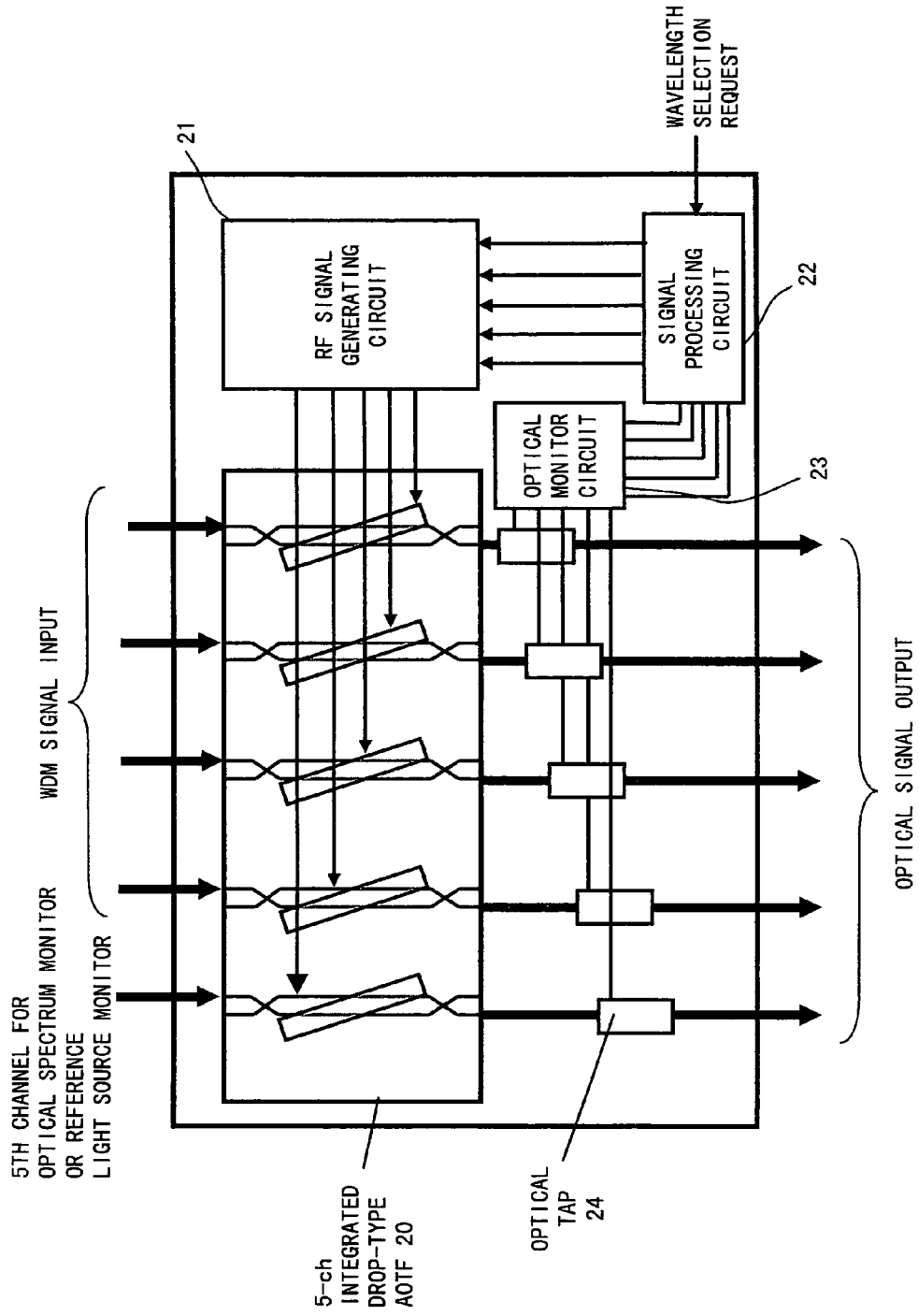
FIG. 3 explains a configuration of a 5-ch integrated drop-type AOTF module.
Figure 4:
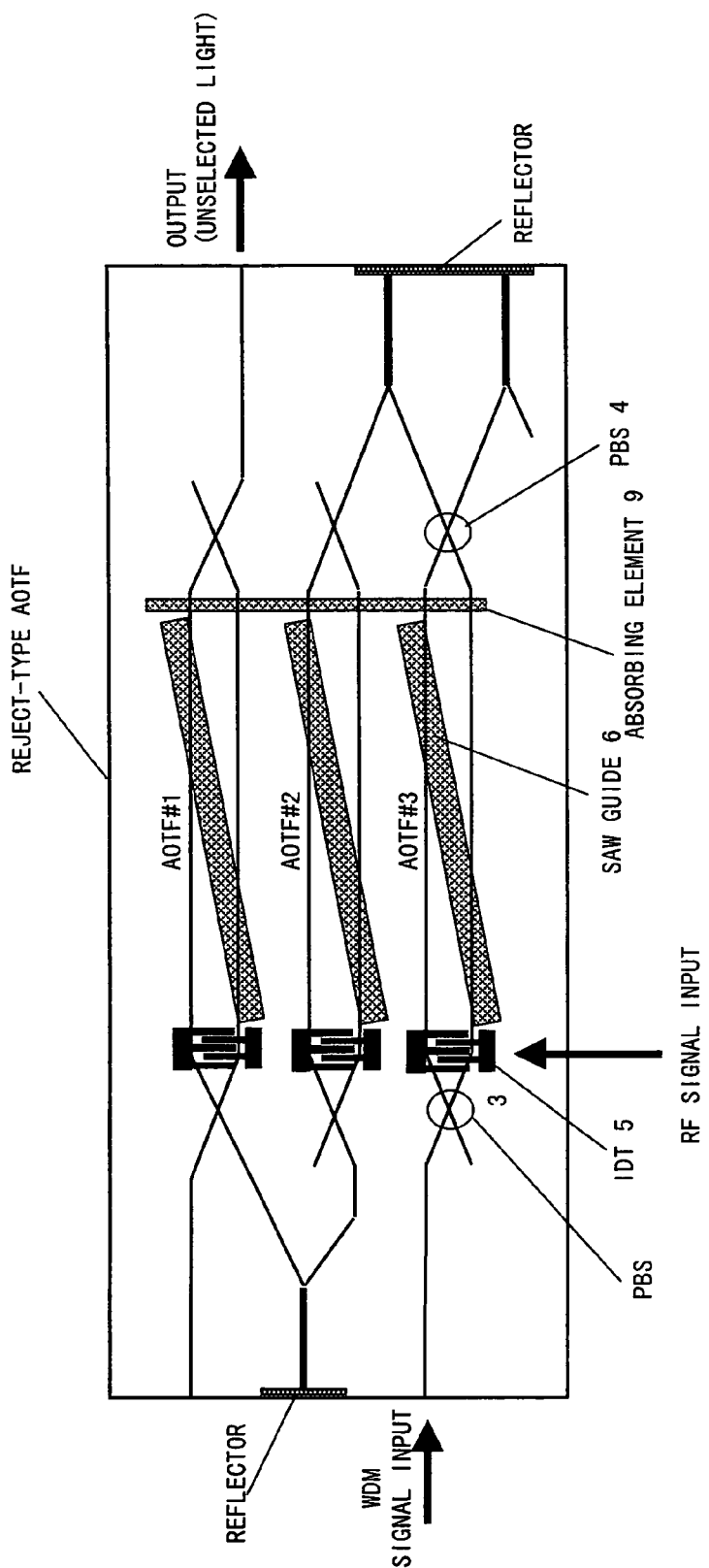
FIG. 4 explains a configuration of a reject-type AOTF.
Figure 5:
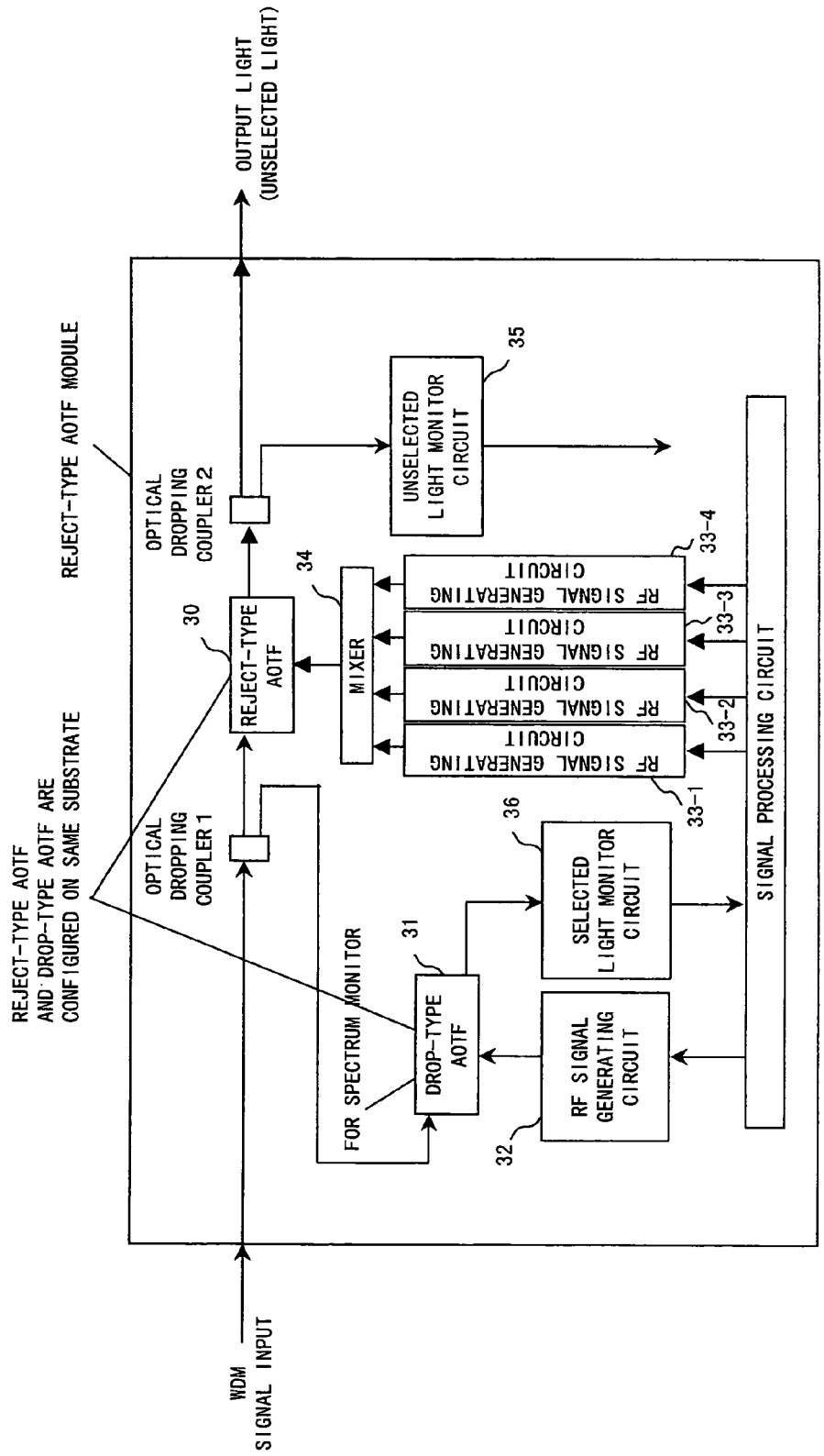
FIG. 5 explains operations of the reject-type AOTF module.
Figure 6:
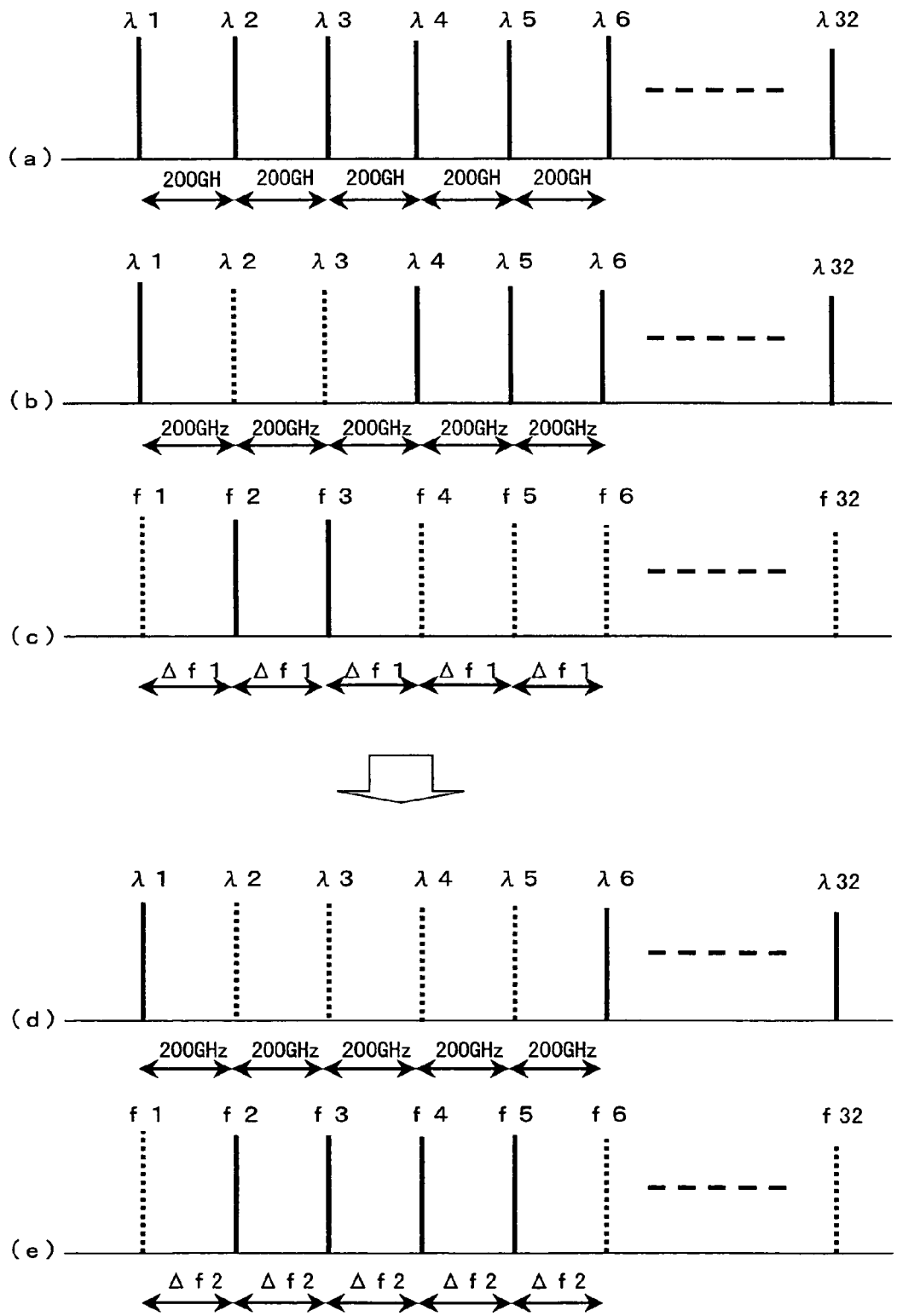
FIG. 6 explains a drawing effect of the reject-type AOTF.
Figure 7:
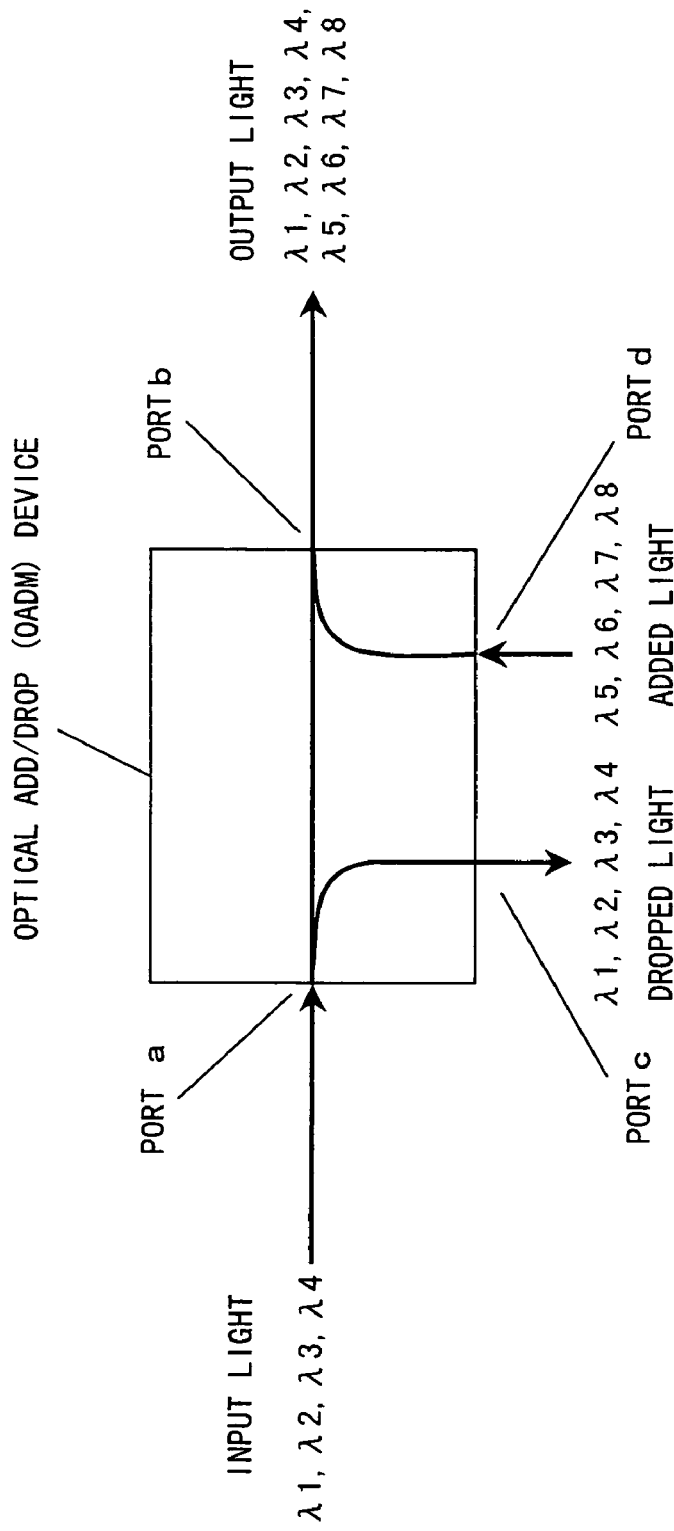
FIG. 7 explains a concept of functions of an optical add/drop (OADM) device.
Figure 8:
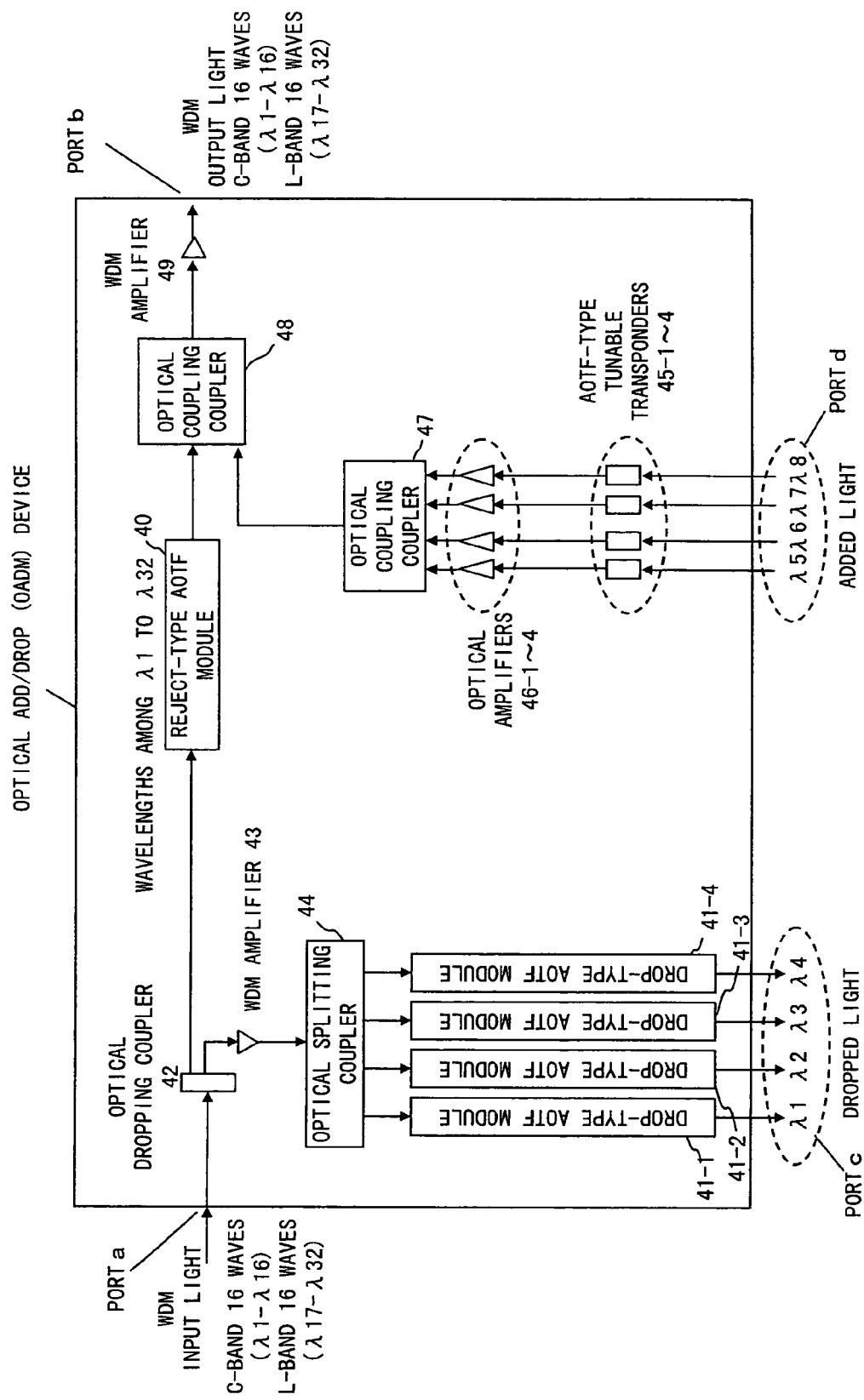
FIG. 8 explains operations of an optical add/drop device using the reject-type AOTF module.
Figure 9:
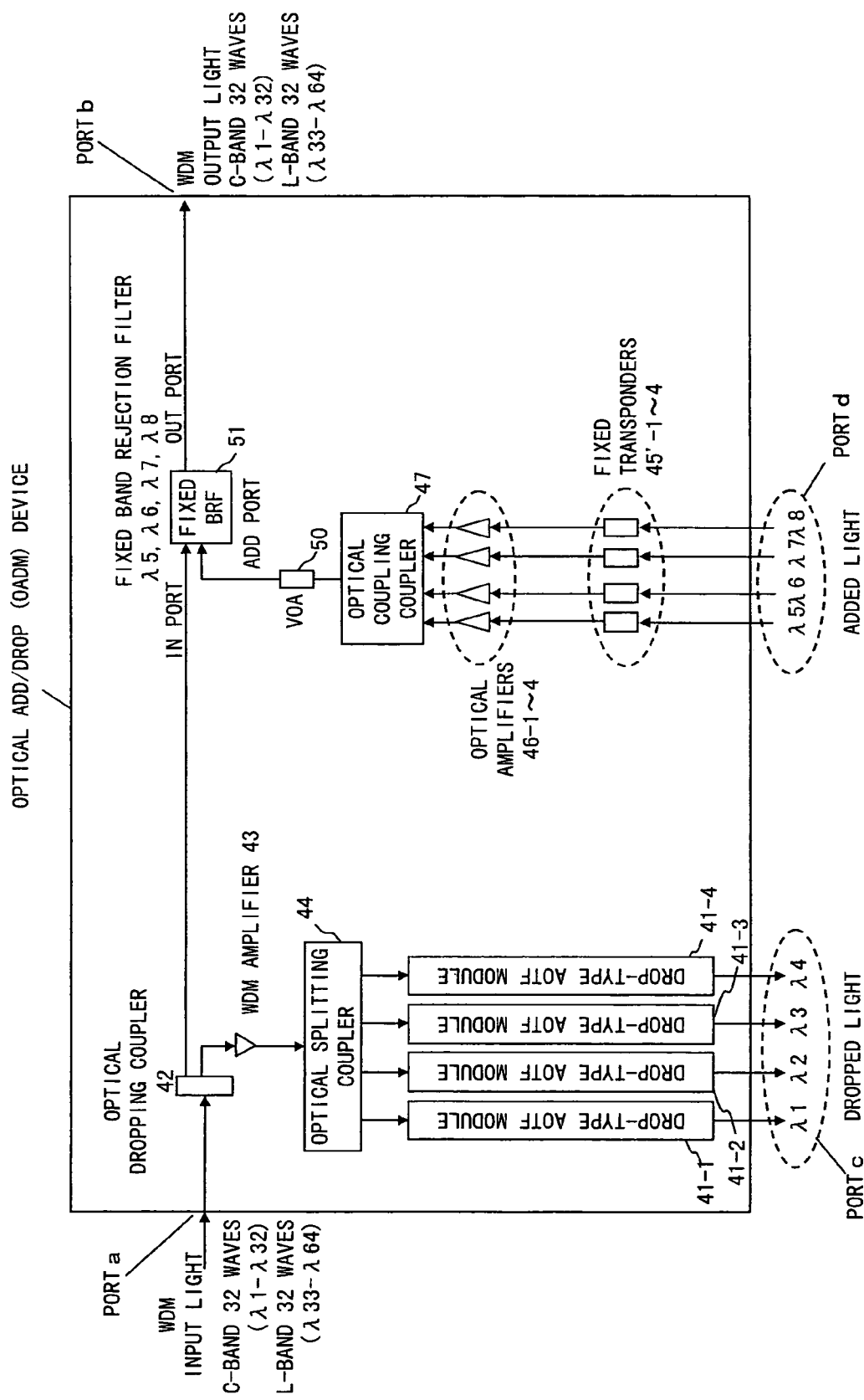
FIG. 9 explains operations of an optical add/drop device using a fixed-band rejection filter.

This configuration is fundamentally the same as that of the 5-ch integrated drop-type AOTF module shown in FIG. 3 except that the number of integrated AOTFs is 17. Therefore, its explanation is omitted.

FIG. 12 explains an AOTF-type tunable transponder.

Respective optical signal inputs are given to opto-electric converters O/Es, converted into electric signals, and given to optical modulators 76-1 to 76-4 as driving signals. LD banks 70-1 to 70-4 are multi-wavelength light sources each outputting light which includes a plurality of wavelengths. The LD banks 70-1 to 70-4 are light sources having different wavelengths. Light beams from the LD banks 70-1 to 70-4 are coupled by optical coupling couplers 71-1 to 71-4, and the coupled light beams are further coupled by an optical coupling coupler 72. Then, the coupled light is coupled with reference light by an optical coupling coupler 73, and split into 5 by an optical splitting coupler 74. A drop-type AOTF 75-5 operates as a filter for selecting the reference light, whereas other drop-type AOTFs 75-1 to 75-4 respectively operate as filters for selecting 4 different wavelengths. Wavelength selections of the drop-type AOTFs 75-1 to 75-4 are made based on the frequency of an RF signal used when the drop-type AOTF 75-5 selects the reference light. Light beams having the respective wavelengths from the drop-type AOTFs 75-1 to 75-4 are input to the optical modulators 76-1 to 76-4, modulated, and output as optical signals having respective wavelengths.

Figure 13:
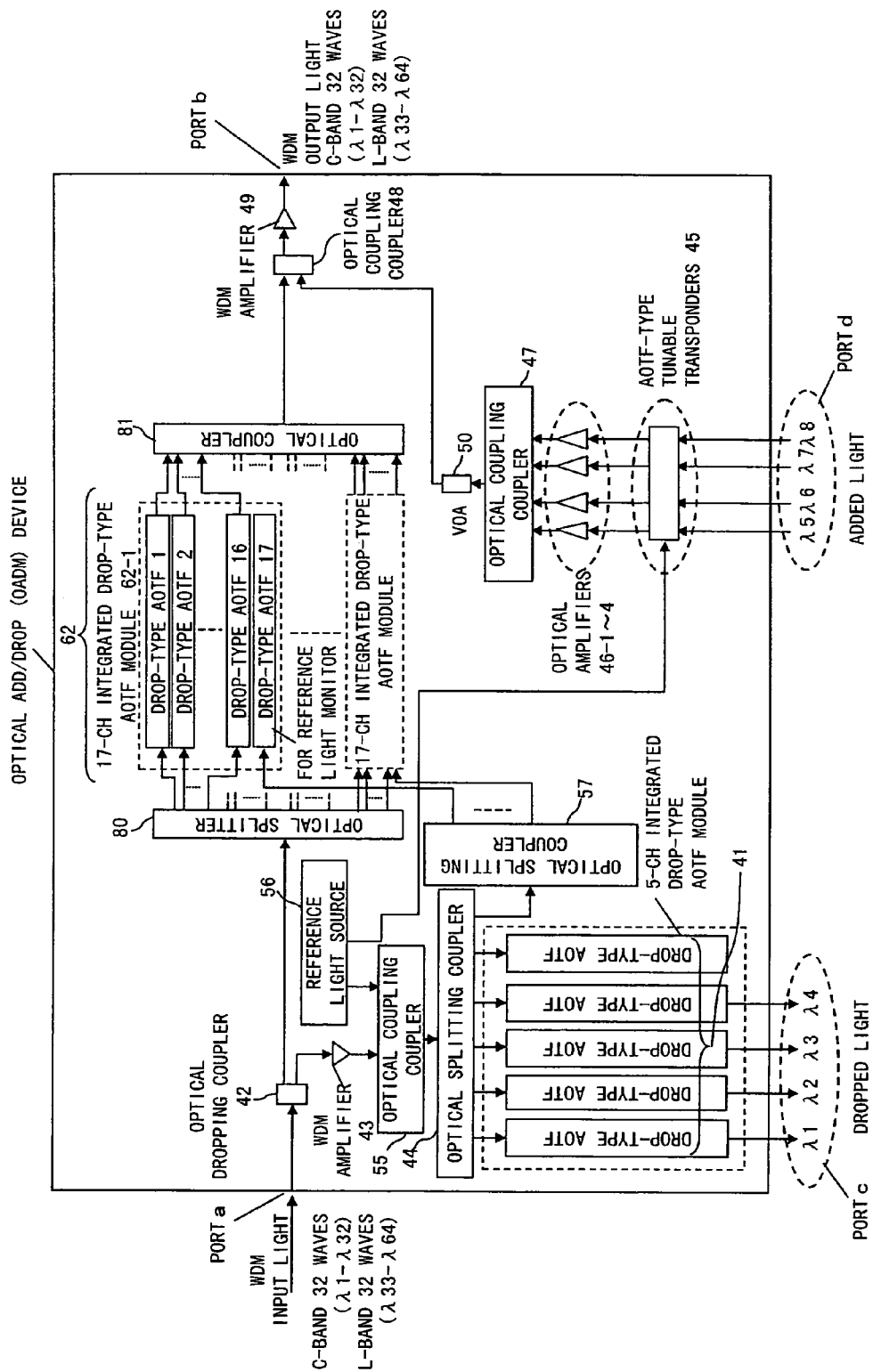
FIG. 13 explains operations of an optical add/drop device according to a second preferred embodiment of the present invention.

FIG. 13 explains operations of an optical add/drop device according to a second preferred embodiment of the present invention.

In this figure, a WDM transmission signal which flows from a network is input to a port a. This figure exemplifies the WDM transmission signal configured with 32 C-band wavelengths ($\lambda 1$ to $\lambda 32$) having an interval of 100 GHz, and 32 L-band wavelengths ($\lambda 33$ to $\lambda 64$) having an interval of 100 GHz. The WDM transmission signal input to the port a is dropped by an optical dropping coupler 42 into an optical signal to be dropped to a port c, and an optical signal to be coupled with light added from a port d and transmitted from the port b to the network. The optical signal to be coupled with the light added from the port d and transmitted from the port b to the network is split into 64 wavelengths by an optical splitter 80 configured by an AWG (Arrayed Waveguide Grating), etc. The 64 split wavelengths are input to drop-type AOTFs of 17-ch integrated drop-type AOTF modules 62-1 to 62-4. Wavelengths selected by the drop-type AOTFs of the 17-ch integrated drop-type AOTF modules 62-1 to 62-4 are coupled by an optical coupler 81 configured by an AWG, etc., coupled with the added light by an optical coupling coupler 48, and transmitted to the port b via a WDM amplifier 49. A 17th channel drop-type AOTF of the 17-ch integrated drop type AOTF modules 62-1 to 62-4 is used to monitor the reference light, and a signal which includes a WDM transmission signal where one or two wavelengths are provided on the side of the shortest or the longest wavelength is used as the reference light. As a control of the drop-type AOTFs, a control is performed to continuously select this reference light, and to stop a selection operation of a 17-ch integrated drop-type AOTF if an operation for rejecting a wavelength from the WDM signal is required in correspondence with a wavelength to be added. In this way, the reject control for a particular wavelength can be implemented. In an adding unit, wavelengths of external Add signals are converted on demand by AOTF-type tunable transponders 45, amplified by optical amplifiers 46-1 to 46-4, coupled by an optical coupling coupler 47, output-adjusted by a VOA 50, and input to the optical coupling coupler 48. To an AOTF-type tunable transponder 45, the reference light is input. Therefore, a control is performed to continuously select the reference light similar to the 17-ch integrated drop-type AOTF modules 62-1 to 62-4 applied to the rejecting unit, and a wavelength is selected from an LD bank in correspondence with a wavelength to be added.

In the meantime, for a control of the drop to the port c, the WDM signal dropped from the optical dropping coupler 42 is optically amplified by a WDM amplifier 43, coupled with the reference light by an optical coupling coupler 55, and split into 6 by an optical splitting coupler 44. A control is performed to continuously select the reference light in one of the drop-type AOTFs 41, and optical signals having respective wavelengths are output from the other 4 drop-type AOTFs according to the drop control.

Figure 14:
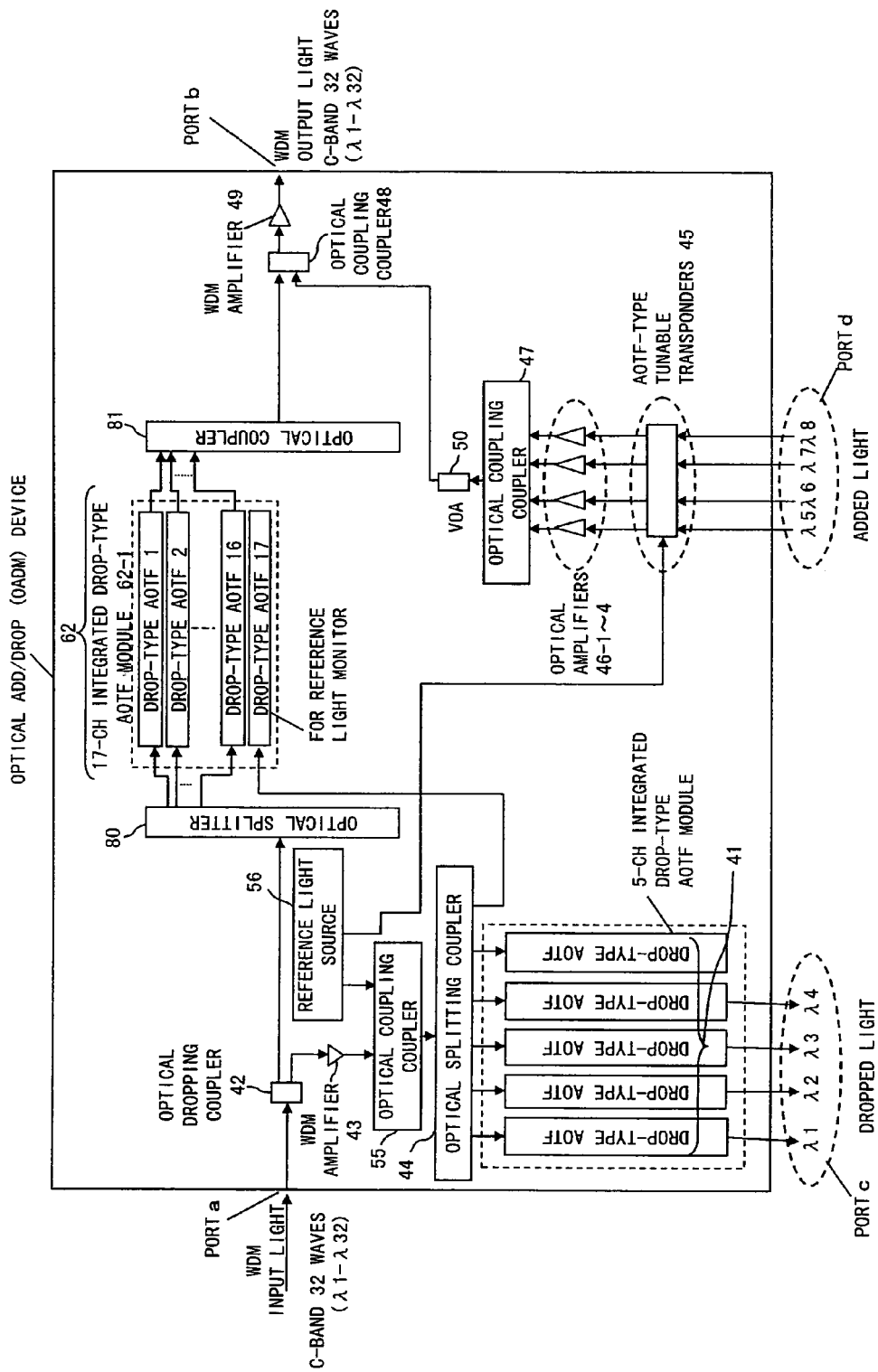
FIG. 14 explains operations of an optical add/drop device according to a third preferred embodiment of the present invention.

FIG. 14 explains operations of an optical add/drop device according to a third preferred embodiment of the present invention.

In this figure, a WDM transmission signal which flows from a network is input to a port a.

This figure exemplifies the WDM transmission signal configured with 32 C-band wavelengths ($\lambda 1$ to $\lambda 32$) having an interval of 100 GHz. The WDM transmission signal input to the port a is dropped by an optical dropping coupler 42 into an optical signal to be dropped to the port c, and an optical signal to be coupled with light added from a port d and transmitted from the port b to the network. The optical signal to be coupled with the light added from the port d and transmitted from the port b to the network is split into 32 wavelengths by an optical splitter 80 configured by a dielectric multi-layer film, etc. The 32 split wavelengths are input to drop-type AOTFs of 17-ch integrated drop-type AOTF modules 62. Wavelengths selected by the drop-type AOTFs of the 17-ch integrated drop-type AOTF modules 62 are coupled by an optical coupler 81 configured by a dielectric multi-layer film, etc., coupled with the added light by an optical coupling coupler 48, and transmitted to the port b via a WDM amplifier 49. A 17th channel drop-type AOTF of the 17-ch integrated drop-type AOTF modules 62 is used to monitor the reference light, and a signal which includes a WDM transmission signal where one or two wavelengths are provided on the side of the shortest or the longest wavelength is used as the reference light. As a control of the drop-type AOTFs, a control is performed to continuously select this reference light, and to stop a selection operation of each corresponding 17-ch integrated drop-type AOTF among selection operations of the drop-type AOTFs of the 17-ch integrated drop-type AOTF modules 62 if an operation for rejecting a wavelength from the WDM signal is required in correspondence with a wavelength to be added. In this way, the reject control for a particular wavelength can be implemented. In an adding unit, wavelengths of external Add signals are converted on demand by AOTF-type tunable transponders 45, amplified by optical amplifiers 46-1 to 46-4, coupled by an optical coupling coupler 47, output-adjusted by a VOA 50, and input to the optical coupling coupler 48. To an AOTF-type tunable transponder 45, the reference light is input. Therefore, a control is performed to continuously select the reference light similar to the 17-ch integrated drop-type AOTF modules 62 applied to the rejecting unit, and a wavelength is selected from an LD bank in correspondence with a wavelength to be added.

In the meantime, for a control of the drop to the port c, a WDM signal dropped from the optical dropping coupler 42 is optically amplified by a WDM amplifier 43, coupled with the reference light by an optical coupling coupler 55, and split into 6 by an optical splitting coupler 44. A control is performed to continuously select the reference light in one of the drop-type AOTFs 41, and optical signals having respective wavelengths are output from the other 4 drop-type AOTFs according to the drop control.

Figure 15:
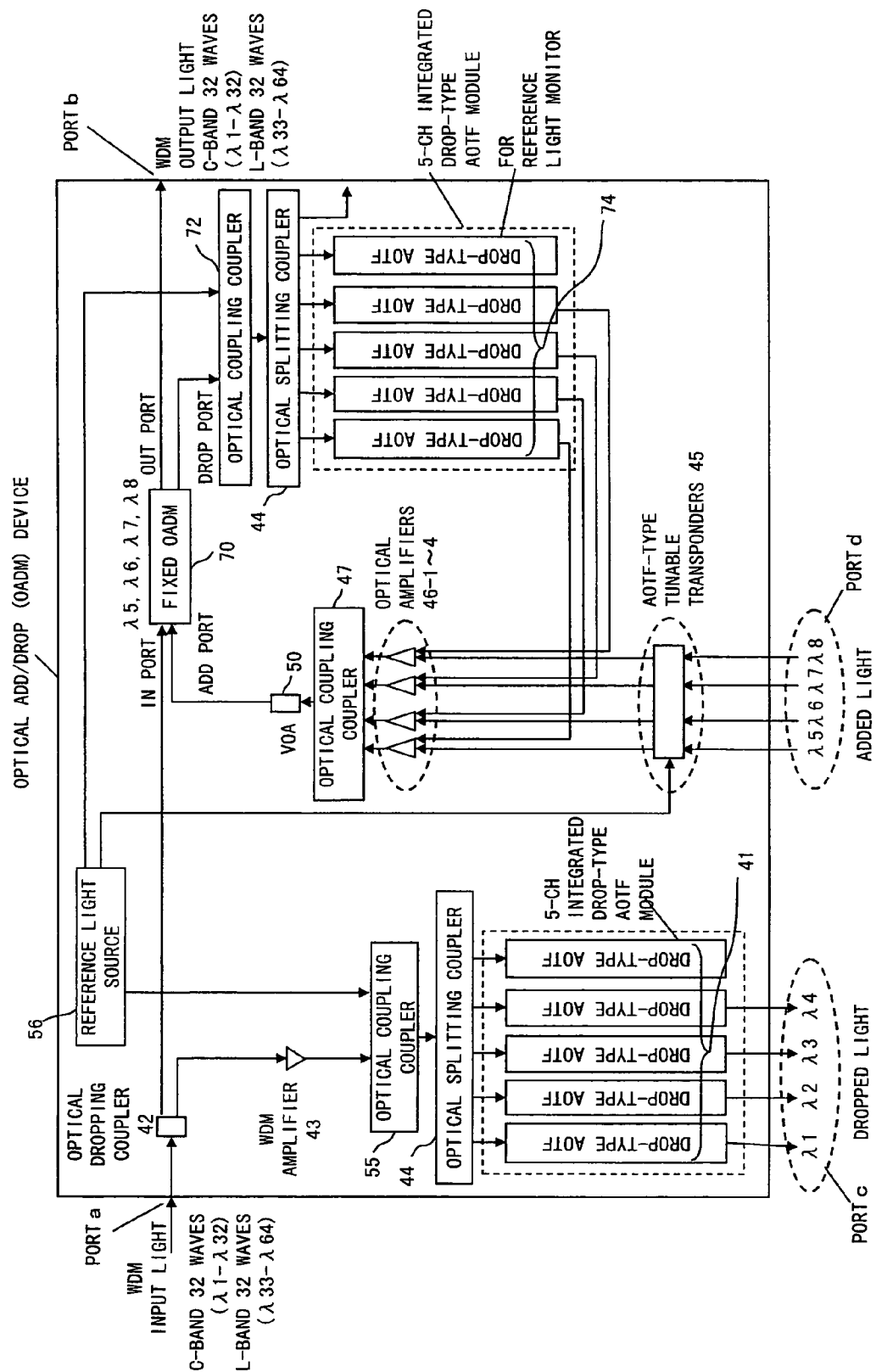
FIG. 15 explains operations of an optical add/drop device according to a fourth preferred embodiment of the present invention.

FIG. 15 explains operations of an optical add/drop device according to a fourth preferred embodiment of the present invention.

In this figure, a WDM transmission signal which flows from a network is input to a port a. This figure exemplifies the WDM transmission signal configured with 32 C-band wavelengths ($\lambda 1$ to $\lambda 32$) having an interval of 100 GHz, and 32 L-band wavelengths ($\lambda 33$ to $\lambda 64$) having an interval of 100 GHz. The WDM transmission signal input to the port a is dropped by an optical dropping coupler 42 into an optical signal to be dropped to a port c, and an optical signal to be coupled with light added from a port d and transmitted from the port b to the network. Wavelengths ($\lambda 5$ to $\lambda 8$) of the optical signal to be coupled with the light added from the port d and transmitted from the port b to the network are fixedly rejected from the WDM signal by a fixed OADM device 70 configured by a dielectric multi-layer film, etc. The rejected wavelengths ($\lambda 5$ to $\lambda 8$) are output to a Drop port. The wavelengths ($\lambda 5$ to $\lambda 8$) output to the Drop port are coupled with the reference light by an optical coupling coupler 72, and input to an optical splitting coupler 73. The 5 optical signals split by the optical splitting coupler 73 are input to 5-ch integrated drop-type AOTF modules 74. one of drop-type AOTFs of the 5-ch integrated drop-type AOTF module 74 performs a control to continuously select the reference light, and the wavelengths $\lambda 5$ to $\lambda 8$ are controlled to be selected by the other 4 drop-type AOTFs based on the above described reference light, and these wavelengths are output. A rejection is made by stopping the other 4 selection operations of the drop-type AOTFs, and light is added. Optical signals output from optical coupling couplers 71-1 to 71-4 are amplified by optical amplifiers 46-1 to 46-4, coupled by an optical coupling coupler 47, and output-adjusted by a VOA 50, and input to an Add port of the fixed OADM device 70. The input Add signal is added to the signal of the In port, and output to an Output port.

To an AOTF-type tunable transponder 45, the reference light is input. Therefore, a control is performed to continuously select the reference light similar to the 5-ch integrated drop-type AOTF module 74 applied to the rejecting unit, and a wavelength is selected from an LD bank in correspondence with a wavelength to be added.

In the meantime, for a control of the drop to the port c, the WDM signal dropped from the optical dropping coupler 42 is optically amplified by a WDM amplifier 43, coupled with the reference light by an optical coupling coupler 55, and split into 6 by an optical splitting coupler 44. A control is performed to continuously select the reference light in one of the drop-type AOTFs 41, and optical signals having respective wavelengths are output from the other 4 drop-type AOTFs according to the drop control.

Figure 16:
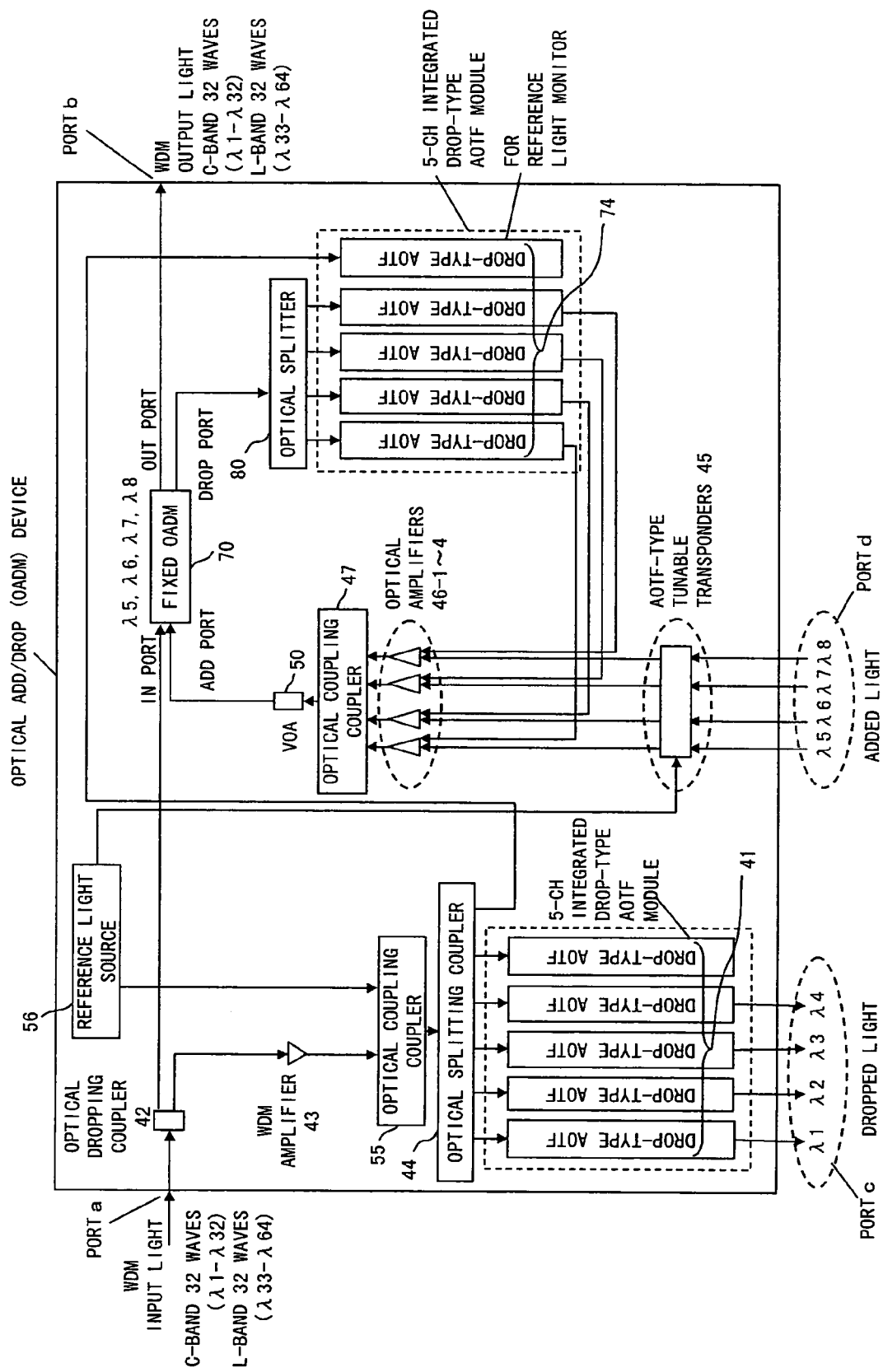
FIG. 16 explains operations of an optical add/drop device according to a fifth preferred embodiment.

FIG. 16 explains operations of an optical add/drop device according to a fifth preferred embodiment of the present invention.

A fundamental configuration shown in FIG. 16 is similar to that shown in FIG. 15. In FIG. 15, the output of the fixed OADM device 70 is generated by the optical splitting coupler 73 as input signals to the 5-ch integrated drop-type AOTF module 74. In the meantime, in FIG. 16, there is a difference in a point that the output of a fixed OADM device 70 is split by an optical splitter 80 configured by an AWG, etc. There is also a difference in a point that reference light is input from the output of an optical splitting coupler 44 to one of the drop-type AOTFs of a 5-ch integrated drop-type AOTF module 74. Because other operations are similar to those shown in FIG. 15, their detailed explanations are omitted.

According to the preferred embodiments of the present invention, a dynamic OADM can be configured only with a drop-type AOTF, and the following effects can be achieved.
1) A reject-type AOTF becomes unnecessary.
2) Complexity of control caused by the drawing effect is resolved.
3) A deterioration of the D/U characteristic caused by mixture of RF signals is eliminated.
4) High-speed wavelength rejection can be made because an optical spectrum analyzer becomes unnecessary. This enables an OADM device to be applied to optical burst switching.
5) A wavelength interval of 100 GHz can be implemented.
6) A dynamic OADM can be configured with ease.
7) The number of nodes can be increased when an optical network is configured because a wavelength added by an adding unit becomes variable.

What is claimed is:

1. An optical add/drop device for adding/dropping an optical signal having a predetermined wavelength to/from a wavelength multiplexed optical signal which flows from a network, comprising:
   a dropping unit for dropping an input wavelength multiplexed optical signal;
   a splitting unit for splitting an optical signal having a predetermined wavelength from a first optical signal dropped by said dropping unit;
   a rejecting unit, which is configured by an acousto-optic tunable filter, for selecting a through optical signal by applying a corresponding RF signal to the acousto-optic tunable filter, for rejecting an optical signal to be rejected by storing an RF signal applied to the acousto-optic tunable filter, and for rejecting an optical signal having a same wavelength as that of an optical signal to be added from a second optical signal dropped by said dropping unit; and
   an adding unit for adding an optical signal having a predetermined wavelength to the optical signal which passes through said rejecting unit;
   a transponder unit for generating the light to be added, wherein said transponder unit comprises:
      an opto-electric converting unit, to which an optical signal to be added is input, for converting the optical signal into an electric signal,
      a multi-wavelength light source,
      a selecting unit for selecting light having a necessary wavelength from light output from said multi-wavelength light source, and
      a modulating unit for modulating the selected multi-wavelength light with the electric signal obtained by said opt-electric converting unit.

2. The optical add/drop device according to claim 1, wherein said selecting unit is a drop-type acousto-optic tunable filter.

3. An optical add/drop device, which adds/drops an optical signal having a predetermined wavelength to/from a wavelength multiplexed optical signal which flows from a network, comprising:
   a fixed adding/dropping unit, whose operation for adding/dropping an optical signal is restricted to a fixed wavelength, for receiving a wavelength multiplexed optical signal which flows from a network, and for adding/dropping an optical signal;
   a rejecting unit, which is configured by an acousto-optic tunable filter and to which an optical signal having a wavelength dropped from said fixed adding/dropping unit is input, for passing an optical signal having a wavelength desired to pass through by applying a corresponding RF signal to the acousto-optic tunable filter, and for rejecting an optical signal having a wavelength desired to be rejected by stopping a corresponding RF signal from being applied to the acousto-optic tunable filter;
   an adding unit for adding an optical signal by inputting an optical signal having a same wavelength as that of the rejected optical signal to said fixed adding/dropping unit; and
   a transponder unit for generating the light to be added, wherein said transponder unit comprises:
      an opto-electric converting unit, to which an optical signal to be added is input, for converting the optical signal into an electric signal,
      a multi-wavelength light source,
      a selecting unit for selecting light having a necessary wavelength from light output from said multi-wavelength light source, and
      a modulating unit for modulating the selected multi-wavelength light with the electric signal obtained by said opt-electric converting unit.

4. The optical add/drop device according to claim 3, wherein said selecting unit is a drop-type acousto-optic tunable filter.

5. An optical adding/dropping method for use in an optical add/drop device for adding/dropping an optical signal having a predetermined wavelength to/from a wavelength multiplexed optical signal which flows from a network, comprising:
   dropping an input wavelength multiplexed optical signal;
   splitting an optical signal having a predetermined wavelength from a first optical signal dropped by a dropping unit;
   using an acousto-optic tunable filter, selecting a through optical signal by applying a corresponding RF signal to the acousto-optic tunable filter, rejecting an optical signal to be rejected by stopping an RF signal applied to the acousto-optic tunable filter, and rejecting an optical signal having a same wavelength as that of an optical signal to be added from a second optical signal dropped by the dropping unit; and adding an optical signal having a predetermined wavelength to an optical signal which passes through in a rejecting unit; and generating the light to be added, wherein said generating comprises:
receiving an optical signal to be added is and converting the optical signal into an electric signal,
providing a multi-wavelength light source,
selecting light having a necessary wavelength from light output from the multi-wavelength light source, and
modulating the selected multi-wavelength light with the electric signal obtained by said opt-electric converting.

6. The optical adding/dropping method according to claim 5, wherein said selecting is implemented by using a drop-type acousto-optic tunable filter.

7. An optical adding/dropping method for use in an optical add/drop device, which adds/drops an optical signal having a predetermined wavelength to/from a wavelength multiplexed optical signal which flows from a network, comprising:
receiving a wavelength multiplexed optical signal which flows from a network, adding/dropping an optical signal, and restricting an operation for adding/dropping an optical signal to a fixed wavelength;
using an acousto-optic tunable filter, being input with an optical signal having a wavelength dropped from a fixed adding/dropping unit, passing an optical signal having a wavelength desired to pass through by applying a corresponding RF signal to the acousto-optic tunable filter, and rejecting an optical signal having a wavelength desired to be rejected by stopping a corresponding RF signal from being applied to the acousto-optic tunable filter; and
adding an optical signal having a same wavelength as that of the rejected optical signal, further comprising
generating the light to be added, wherein said generating comprises
receiving an optical signal to be added and converting the optical signal into an electric signal,
providing a multi-wavelength light source,
selecting light having a necessary wavelength from light output from the multi-wavelength light source, and
modulating the selected multi-wavelength light with the electric signal obtained by said opt-electric converting.

8. The optical adding/dropping method according to claim 7, wherein said selecting is implemented by using a drop-type acousto-optic tunable filter.

* * * * *

UNITED STATES PATENT AND TRADEMARK OFFICE
CERTIFICATE OF CORRECTION

PATENT NO. : 7,187,814 B2 Page 1 of 1
APPLICATION NO. : 10/960023
DATED : March 6, 2007
INVENTOR(S) : Masaji Noguchi et al.

It is certified that error appears in the above-identified patent and that said Letters Patent is hereby corrected as shown below:

Column 13, Line 53, change "storing" to --stopping--.

Signed and Sealed this

Twenty-sixth Day of June, 2007

JON W. DUDAS
*Director of the United States Patent and Trademark Office*